United States Patent [19]

Spinelli

[11] 4,134,670

[45] Jan. 16, 1979

[54] HIGH CAPACITY PHOTOCOPY OPTICAL SCANNING SYSTEM

[75] Inventor: Richard A. Spinelli, Rochester, N.Y.

[73] Assignee: Xerox Corporation, Stamford, Conn.

[21] Appl. No.: 798,224

[22] Filed: May 18, 1977

[51] Int. Cl.² .................... G03G 15/28; G03G 15/32; G03B 27/44
[52] U.S. Cl. ....................................... 355/8; 355/3 R; 355/46
[58] Field of Search .................. 355/3 R, 7, 8, 11, 22, 355/24, 46

[56] References Cited

U.S. PATENT DOCUMENTS

| | | | |
|---|---|---|---|
| 3,524,928 | 8/1970 | Hoskins | 355/8 X |
| 3,694,073 | 9/1972 | Bhagat | 355/3 R X |
| 3,775,102 | 11/1973 | Punnett | 355/3 R X |
| 3,994,580 | 11/1976 | Hoffman | 355/11 X |
| 4,008,958 | 2/1977 | Kingsland | 355/11 X |

*Primary Examiner*—Fred L. Braun

[57] ABSTRACT

A pair of lenses, side by side, create twin optical paths for image projection from a single object station to twin photoreceptor drums, rotating in opposite directions. The lens pair, as it moves back and forth, is scanning in both directions and alternately projecting onto one and the other of the two photoreceptors.

7 Claims, 5 Drawing Figures

HIGH CAPACITY PHOTOCOPY OPTICAL SCANNING SYSTEM

BACKGROUND OF THE INVENTION

This invention relates to an optical scanning system for use in a photocopying environment.

Prior art relevant to this invention is typified by the optical system in the Xerox 4000 copier. In that system, represented schematically in FIG. 1, a stationery object is scanned by a lens which projects a composite image of the same onto a moving photoreceptor drum. In the case of 1:1 image magnification, the lens is located midway between object and image plane and moves at half the tangential velocity of the photoreceptor drum. Due to the nature of the system, an ordered image is composed on the moving photoreceptor during only one direction of scan. The return travel of the optics represents lost time in the system. As a result, quick return or flyback arrangements for these scanning optics are used to minimize such lost time.

It is an object of this invention to provide a scanning optical system of the type just described in which scanning is performed and an ordered image projected during both directions of lens travel.

SUMMARY OF THE INVENTION

This invention is practiced in one form by a pair of lenses, side by side, which create twin optical paths for image projection from a single object station to twin photoreceptor drums, rotating in opposite directions. The lens pair, as it moves back and forth, is scanning in both directions and alternately projecting onto one and the other of the two photoreceptors.

For a better understanding of this invention, reference is made to the following detailed description of an exemplary embodiment, given in connection with the accompanying drawing.

DRAWING

DESCRIPTION

Figure 1:
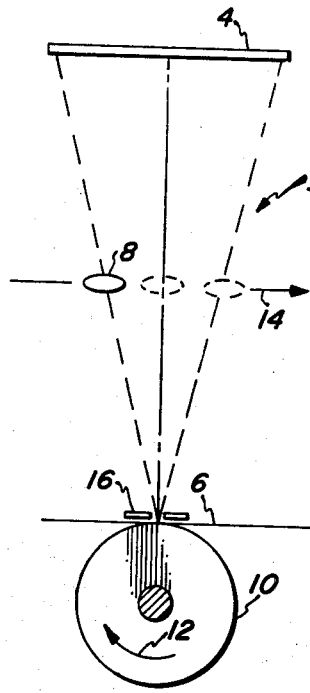
FIG. 1 is a schematic optical diagram of a typical prior art scanning system.

Referring now to FIG. 1, the prior art discussed above is represented generally by an optical system 2. Optical system 2 includes an object station or platen 4, an image station or image plane 6, and a projection lens 8 disposed between the object and image stations. A photoreceptor drum 10 is rotatably mounted as indicated by the arrow 12 and is disposed tangential to the image plane 6 at the image station. An exposure slit member 16 is located adjacent to the point of tangency of photoreceptor 10 and image plane 6 to transmit only a strip of the image of object plane 4 to the photoreceptor 10. As the projection lens 8 scans the object plane in the direction indicated by arrow 14 from the extreme left position and through the positions represented in phantom, a composite image of object plane 4 is laid down on the photoreceptor 10 as it moves in synchronism with the scanning lens past the exposure slit 16. As will be appreciated, after the lens traverses from left to right to generate such a composite image, it must return again to the extreme left before starting another scan and image projection. It is this lost motion and lost time which the present invention is directed to recover.

Figure 2:
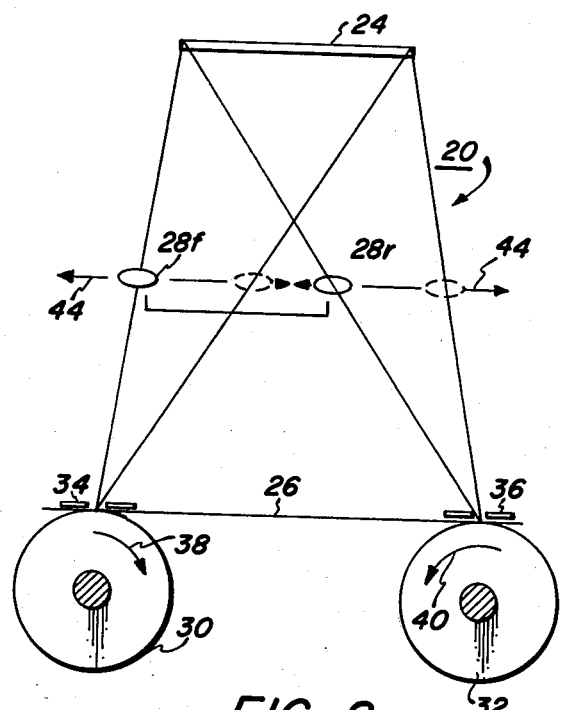
FIG. 2 is a schematic optical diagram of a scanning system according to the present invention.

Referring now to FIG. 2, the optical system of this invention is generally indicated at 20. It includes an object plane or platen 24 and an image plane 26, object and image planes being respectively in object and image conjugate relationship relative to a pair of projection lenses 28f and 28r.

Lenses 28f and 28r are disposed in the same plane between platen 24 and image plane 26, and form parallel or twin optical paths between the object and image planes. A first or forward photoreceptor drum 30 is disposed at the image station of one of the twin optical paths, and a second or reverse photoreceptor drum 32 is disposed at the image station of the second optical path. Photoreceptor drums 30 and 32 are tangential to the image plane 26 and an exposure slit 34 and 36 is included in each of the twin optical systems as described in connection with FIG. 1. Photoreceptor drum 30 rotates in the "forward" direction represented by the arrow 38; photoreceptor drum 32 rotates in the "reverse" direction represented by arrow 40.

Projection lenses 28f and 28r are interconnected or ganged, and are movable together along the reciprocal path indicated by arrows 44 to scan the object platen 24. Lenses 28f and 28r are shown in solid line positions at the beginning of the their "forward" scan, and in phantom positions at the end of the forward scan and the beginning of the "reverse" scan. During the forward scan, an ordered composite image of the object plane 24 is laid down on the forward rotating photoreceptor 30 through the image station at exposure slit 34. At the same time, the twin optical system of projection lens 28r and reverse rotating photoreceptor 32 are inoperative to produce an ordered image. Conversely, during the movement of lenses 28f and 28r from right to left, the reverse direction of scan, an ordered image is projected onto reverse rotating photoreceptor 32 while at the same time the optical system of lens 28f and photoreceptor 30 are inoperative. Thus, by means of separate lenses projecting twin images from the same object and separate photorecetors to receive the same, ordered images of the original are projected during both directions of reciprocal scan. Lenses 28r and 28f are appropriately shuttered during forward and reverse scans, respectively, to block out image light from the corresponding photoreceptor as it rotates in the direction inappropriate to the direction of scan. For the sake of clarity in the drawing, the shutters have not been included.

Figure 3:
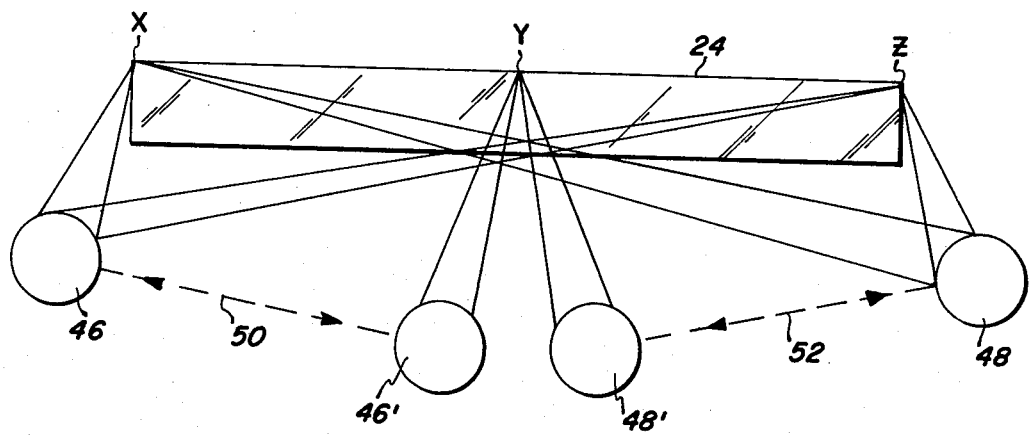
FIG. 3 is a schematic diagram, enlarged relative to FIG. 2, of the illumination system used in connection with the optical system of FIG. 2.

Referring now to FIG. 3, an enlarged view of the platen 24 and its associated illuminating system is shown. A pair of light sources 46 and 48 for object illumination is located under and outboard of the platen 24 in an initial or home position. Light sources 46 and 48 are preferably long linear light sources such as fluorescent lamps, extending from the reader normal to the plane of the drawing, though the details of the light sources per se are not material to the invention. Lamps 46 and 48 are reciprocable along the paths illustrated by arrows 50 and 52 respectively between their home positions and their opposite extreme positions 46' and 48' respectively.

Referring now to both FIGS. 2 and 3, in operation lenses 28f and 28r move from their extreme left position to their phantom line extreme right position for forward scanning and imaging on photoreceptor 30. At the same time, lamps 46 and 48 move from their extreme positions inwardly to positions 46' and 48' respectively, reaching these inward positions when the lenses are at mid scan. At that point, lamps 46 and 48 reverse in direction back toward their home positions while the lenses continue forward scan. In this way, it will be seen that during forward scan the object increment being imaged is primarily illuminated first by lamp 46 and then by lamp 48. The lamp closest to the scan line at any moment is the primary source of illumination; the lamp farthest from the scan line is the secondary source.

Both lamps contribute to the illumination level at every point on the platen. The proximities of each lamp to the area to be imaged determines the ultimate irradiance level at the document.

For example, point X receives the majority of energy from lamp 46 and little energy from lamp 48.

Point Y receives equal energy from both lamps because each is the same distance from point Y.

Point Z receives most of the energy from lamp 48 and little from lamp 46.

Points in between receive varying amounts depending on the relationship of each lamp relative to the point.

At the completion of the forward scan, lenses 28f and 28r are at their extreme right position ready to return for reverse scanning. Simultaneously with the reverse scan, lamps 46 and 48 again move inwardly to positions 46' and 48', again reaching these latter positions at mid scan. Again, lamps 46 and 48 reverse in direction, back toward their home positions while the lenses continue to reverse scan. Thus, on the return scan the object increment being imaged is illuminated first by lamp 48 and then by lamp 46.

Figure 4:
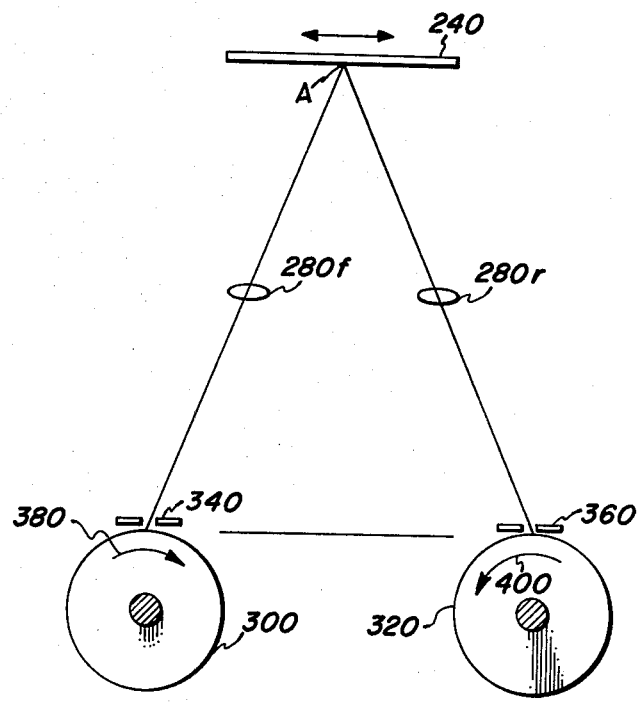
FIG. 4 is a schematic optical diagram of an alternative embodiment of this invention.

From the foregoing, it will be apparent that an optical system has been described herein by which object scanning and projection of an ordered composite image is effected during both directions of reciprocal scan travel. While this invention has been described with reference to a stationery object and moving optics, it will be appreciated that the equivalent result is obtainable using a moving object and stationery optics. FIG. 4 illustrates this. In the FIG. 4 arrangement, stationery lenses 280f and 280r are situated between a reciprocating object platen 240 and photoreceptor drums 300 and 320, rotating in opposite directions. When object platen 240 is moved to the right past an object point A, the composite image of the object from this scan direction is projected by lens 280r and laid down on photoreceptor 320, rotating counterclockwise. Conversely, when the object platen is moving to the left past point A, the composite image of the object is projected through lens 280f onto moving photoreceptor drum 300. As will be appreciated, this is the optical equivalent of the system described in connection with FIG. 2.

Figure 5:
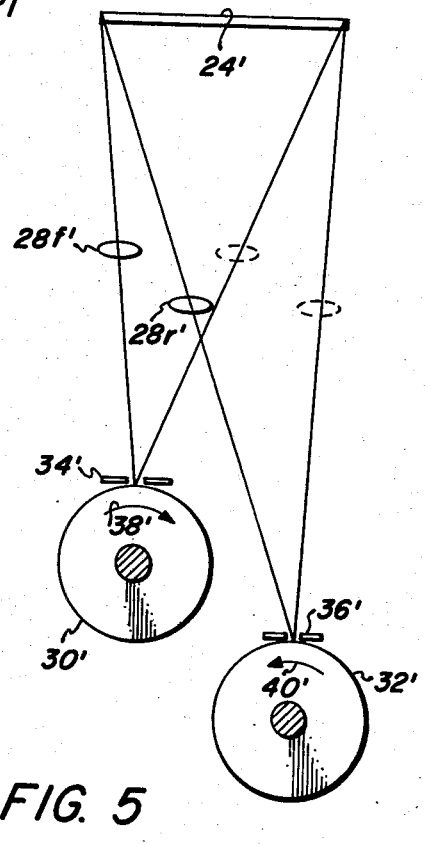
FIG. 5 is a schematic optical diagram of another alternative embodiment of this invention.

Lenses 28f and 28r have been described as located in a common plane between platen 24 and their common image 26. This configuration of the system is only illustrative. FIG. 5 illustrates an alternative arrangement in which the drums 30' and 32' are at different distances from platen 24' and lenses 28f' and 28r' correspondingly at different distances from platen 24'. In 1:1 magnification operation, lenses 28f and 28r are midway between platen 24' and their respective drums 30' and 32'.

The foregoing description of certain embodiments of this invention is given by way of illustration and not of limitation. The concept and scope of the invention are limited only by the following claims and equivalents thereof which may occur to others skilled in the art.

What is claimed is:

1. An optical system for scanning an object in forward and return directions and projecting composite ordered images of said object during scanning in both directions, including:
   an object station
   an image plane
   a first projection lens and a second projection lens disposed in a common plane between said object station and said image plane, said first and second lenses forming twin optical paths between said object station and said image plane,
   means to effect relative reciprocating scanning movement between said object station and said lenses to project twin moving images of said object at said image plane,
   a first photoreceptor surface and a second photoreceptor surface disposed in said image plane for movement therein in opposite directions, said first photoreceptor surface moving in synchronism with said moving images when said reciprocating scanning movement is in said forward direction, said second photoreceptor surface moving in synchronism with said moving images when said reciprocating scanning movement is in said return direction,
   whereby ordered images of said object are alternately formed on said first and second photoreceptor surfaces during scanning in said forward and return directions respectively.

2. An optical system for scanning an object in forward and return directions and projecting composite ordered images of said object during scanning in both directions, including:
   an object platen
   an image plane
   a first projection lens and a second projection lens disposed in a common plane between said object platen and said image plane, said first and second lenses forming twin optical paths and twin images of said object at said image plane,
   said lenses disposed for reciprocating scanning movement together in said forward and return directions relative to said object so that said twin images are moving in corresponding reciprocation along said image plane,
   a first photoreceptor surface and a second photoreceptor surface disposed in said image plane for movement therein in opposite directions, said first photoreceptor surface moving in synchronism with said moving images when said reciprocating scanning movement is in said forward direction, said second photoreceptor surface moving in synchronism with said moving images when said reciprocating scanning movement is in said return direction,
   whereby ordered images of said object are alternately formed on said first and second photoreceptor surfaces during scanning in said forward and return directions respectively.

3. An optical system as defined in claim 2 in which said first and second photoreceptor surfaces are disposed respectively on first and second cylindrical drums disposed tangentially to said image plane and rotating in opposite directions, the lines of tangency of said drums to said image plane forming the instantaneous incremental image lines of which said composite images are integrated.

4. An optical system for scanning an object in forward and return directions and projecting composite ordered images of said object during scanning in both directions, including:

an object platen an image plane a first projection lens and a second projection lens disposed in a common plane between said object platen and said image plane, said first and second lenses forming twin optical paths and twin images of said object at said image plane, said object platen disposed for reciprocating scanning movement in said forward and return directions relative to said lenses so that said twin images are moving in opposite reciprocation along said image plane, a first photoreceptor surface and a second photoreceptor surface disposed in said image plane for movement therein in opposite directions, said first photoreceptor surface moving in synchronism with said moving images when said reciprocating scanning movement is in said forward direction, said second photoreceptor surface moving in synchronism with said moving images when said reciprocating scanning movement is in said return direction, whereby ordered images of said object are alternately formed on said first and second photoreceptor surfaces during scanning in said forward and return directions respectively.

5. An optical system for scanning an object in forward and return directions and projecting composite ordered images of said object during scanning in both directions, including:

an object station a first projection lens and a second projection lens disposed between said object station and respective first and second conjugate image stations, means to effect relative reciprocating scanning movement between said object station and said lenses to project twin moving images of said object at said image stations, a first photoreceptor surface and a second photoreceptor surface disposed respectively in said first and second image stations for movement therein in opposite directions, said first photoreceptor surface moving in synchronism with said moving images when said reciprocating scanning movement is in said forward direction, said second photoreceptor surface moving in synchronism with said moving images when said reciprocating scanning movement is in said return direction, whereby ordered images of said object are alternately formed on said first and second photoreceptor surfaces during scanning in said forward and return directions respectively.

6. An optical system for scanning an object in forward and return directions and projecting composite ordered images of said object during scanning in both directions, including:

an object platen a first projection lens and a second projection lens disposed between said object platen and respective first and second conjugate image stations, said lenses disposed for reciprocating scanning movement together in said forward and return directions relative to said object so that said twin images are moving in corresponding reciprocation at said image stations, a first photoreceptor surface and a second photoreceptor surface disposed respectively in said first and second image stations for movement therein in opposite directions, said first photoreceptor surface moving in synchronism with said moving images when said reciprocating scanning movement is in said forward direction, said second photorecptor surface moving in synchronism with said moving images when said reciprocating scanning movement is in said return direction, whereby ordered images of said object are alternately formed on said first and second photoreceptor surfaces during scanning in said forward and return directions respectively.

7. An optical system as defined in claim 6 in which said first and second photoreceptor surfaces are disposed respectively on first and second cylindrical drums disposed tangentially to said first and second image stations respectively and rotating in opposite directions, the lines of tangency of said drums to said image stations forming the instantaneous incremental image lines of which said composite images are integrated.